United States Patent

Muller et al.

(10) Patent No.: US 12,140,410 B2
(45) Date of Patent: Nov. 12, 2024

(54) METHOD OF AND APPARATUS FOR ESTABLISHING A BLASTING SYSTEM

(71) Applicant: DETNET SOUTH AFRICA (PTY) LTD, Johannesburg (ZA)

(72) Inventors: Elmar Lennox Muller, Johannesburg (ZA); Riaan Lingenfelder Van Wyk, Johannesburg (ZA); Tielman Christiaan Meyer, Johannesburg (ZA); Marius Christo Botha, Johannesburg (ZA)

(73) Assignee: DETNET SOUTH AFRICA (PTY) LTD, Johannesburg (ZA)

( * ) Notice: Subject to any disclaimer, the term of this patent is extended or adjusted under 35 U.S.C. 154(b) by 719 days.

(21) Appl. No.: 17/271,853

(22) PCT Filed: Aug. 21, 2019

(86) PCT No.: PCT/ZA2019/050048
§ 371 (c)(1),
(2) Date: Feb. 26, 2021

(87) PCT Pub. No.: WO2020/047560
PCT Pub. Date: Mar. 5, 2020

(65) Prior Publication Data
US 2021/0318108 A1    Oct. 14, 2021

(30) Foreign Application Priority Data
Aug. 27, 2018 (ZA) .................. 2018/05693

(51) Int. Cl.
*F42D 1/10* (2006.01)
*B25J 5/00* (2006.01)
(Continued)

(52) U.S. Cl.
CPC ............... *F42D 1/10* (2013.01); *B25J 5/007* (2013.01); *B25J 11/0025* (2013.01); *F42D 1/04* (2013.01)

(58) Field of Classification Search
CPC ........ F42D 1/04; F42D 1/08–12; B25J 5/005; B25J 5/007; B25J 11/0025
See application file for complete search history.

(56) References Cited

U.S. PATENT DOCUMENTS 2,930,276 A * 3/1960 Smith ...................... F42D 1/10
                                                        102/314
3,457,859 A * 7/1969 Guenter ................ E21B 43/263
                                                        102/312
(Continued)

FOREIGN PATENT DOCUMENTS

EP          3218667 B1    10/2018

OTHER PUBLICATIONS

International Preliminary Report on Patentability for PCT/ZA2019/050048, international filing date of Aug. 21, 2019, date of completion Feb. 5, 2021, 10 pages.
(Continued)

*Primary Examiner* — Bret Hayes
(74) *Attorney, Agent, or Firm* — CANTOR COLBURN LLP

(57) ABSTRACT

A blasting system which is established using an autonomously controlled vehicle to traverse a blast site, moving from blast hole to blast hole and at each blast hole using robotic means to prepare each blast hole for detonation.

6 Claims, 2 Drawing Sheets

(51) Int. Cl.
*B25J 11/00* (2006.01)
*F42D 1/04* (2006.01)

(56) References Cited

U.S. PATENT DOCUMENTS

2017/0356292 A1  12/2017  Wang et al.
2018/0100394 A1   4/2018  Baiden
2018/0106584 A1   4/2018  Santos et al.

OTHER PUBLICATIONS

International Search Report for PCT/ZA2019/050048, international filing date of Aug. 21, 2019, date of mailing Nov. 29, 2019, 4 pages.
Written Opinion for PCT/ZA2019/050048, international filing date of Aug. 21, 2019, date of mailing Nov. 29, 2019, 7 pages.

* cited by examiner

METHOD OF AND APPARATUS FOR ESTABLISHING A BLASTING SYSTEM

CROSS-REFERENCE TO RELATED APPLICATIONS

This application is a U.S. national stage application of International Application No. PCT/ZA2019/050048 entitled "METHOD OF AND APPARATUS FOR ESTABLISHING A BLASTING SYSTEM", which has an international filing date of 21 Aug. 2019, and which claims priority to South African Patent Application No. 2018/05693, filed 27 Aug. 2018.

BACKGROUND OF THE INVENTION

This invention relates to the establishment of a blasting system.

Typically in the establishment of a blasting system a plurality of blast holes are drilled at a blast site or bench. Thereafter one or more operators traverse the blast site and, at each blast hole, position a detonator, optionally together with a booster, in the blast hole. The detonator is preprogrammed with a particular time delay associated with the blast hole. If the blasting system is based on the use of flexible conductors such as electrical conductors or shock tubes the detonators are connected to the conductors and ultimately to a harness which extends to a blasting machine. The holes are then loaded with emulsion and, after integrity tests and the like, the blasting process can be initiated.

If the blasting system is a wireless one then each detonator or detonator-booster assembly, as the case may be, is not connected to a conductor but functions in a manner which is determined by the reception of signals transmitted wirelessly from a blasting machine. Often in this type of arrangement return signals from the individual detonators to the blasting machine are not possible primarily due to the difficulty of return direction communication.

The aforementioned blasting system processes have not been described in detail for generally they are known in the art. These processes are however laborious and repetitive and, particularly in arduous conditions which may pertain on site or at an underground location, are prone to human error.

An object of the present invention is to address, at least to some extent, difficulties associated with the establishment of a blasting system.

SUMMARY OF THE INVENTION

The invention provides, in the first instance, a method of establishing a blasting system which includes the steps of surveying a blast site to generate data which determines the respective positions of a plurality of blast holes previously formed at the site, calculating from the data produced by the survey, for each blast hole, a respective time delay, allowing an autonomously controlled vehicle to traverse the blast site moving successively from blast hole to blast hole, at each blast hole using robotic means to remove a detonator from a store of a plurality of detonators on the vehicle, using a processor to program the removed detonator with a respective time delay calculated for the blast hole, using robotic means to place the programmed detonator in the blast hole and pumping into the blast hole a predetermined volume of an emulsion from a source carried on or associated with the vehicle.

The method described is suitable for use in the establishment of a wireless system i.e. one in which the detonators are not directly interconnected by physical means such as electrical conductors, shock tubes or the like.

If the detonator system is not a wireless system then, at each blast hole, the method may include the additional steps of: using robotic means to connect the removed detonator to a flexible signal-transmitting conductor and to a booster thereby to form a booster assembly and thereafter placing the booster assembly into the blast hole.

The flexible signal-transmitting conductor may transmit an electrical or electronic signal or it may be a fibre-optic cable. Preferably the signal-transmitting conductor is a shock tube.

The robotic means may be used to interconnect the various detonators at the blast holes to a harness which includes another flexible signal-transmitting conductor which extends to a blasting machine.

The invention further extends to apparatus for use in establishing a blasting system which includes a vehicle with a load bed, ground-engaging drivers which support the load bed, and a drive system for driving the ground-engaging drivers in a controlled manner over the ground, and mounted on or coupled to the load bed, navigation aids for determining the position of the vehicle in relation to a blast site at which a plurality of blast holes have previously been formed, a processor, responsive to the navigation aids, for controlling movement of the vehicle at the blast site whereby the vehicle is controlled to move in succession to each of the blast holes, a store of a plurality of detonators, robotic means, operable by the processor, at each blast hole, to remove from the store a detonator and to program the removed detonator with a delay time calculated for the respective blast hole and to place the programmed detonator into the blast hole, and a pump, under the control of the processor, to pump a controlled amount of emulsion from a source on or associated with the vehicle into the respective blast hole.

The vehicle may include a power source to power the respective components carried by the vehicle. Alternatively, the vehicle may be connected to a power source located on surface by means of a suitable power cable to conduct power from a power source, to the respective components.

The detonator may be connected to a booster to form a booster assembly which is placed into the bore hole.

The processor may cause integrity testing of each detonator or detonator-booster assembly to be carried out prior to, and after, placement thereof into the respective blast hole.

Depending on the nature of the detonating system i.e. wireless or non-wireless, each detonator may be connected to an elongate flexible signal-transmitting conductor which is carried on the load bed. The nature of the connection may vary according to requirement. In one embodiment each connection is made by an insertion process wherein one end of a signal transmitting conductor is inserted into a suitable connector. In a different approach welding techniques, e.g. ultrasonic welding processes, are employed to ensure effective and waterproof connections are made as appropriate.

The elongate signal transmitting conductor may be electrically based or it may embody a fibre-optic cable or the like. Preferably use is made of a shock tube.

The processor may be responsive to data held in a memory unit. Such data may relate to different blasting sequences and programs. The processor may be configured to implement an adaptive learning process in which the outcome of each blast is measured and correlated to the assignment of time delays to detonators in different blast holes. Through the use of appropriate feedback factors a form of artificial intelligence is evolved wherein the processor self-teaches itself to ensure that the way in which blasting times are assigned are modified and improved so that with each blasting system a better blasting result is achieved than in a preceding blasting system.

BRIEF DESCRIPTION OF THE DRAWINGS

The invention is further described by way of example with reference to the accompanying drawings in which.

DESCRIPTION OF PREFERRED EMBODIMENT

Figure 1:
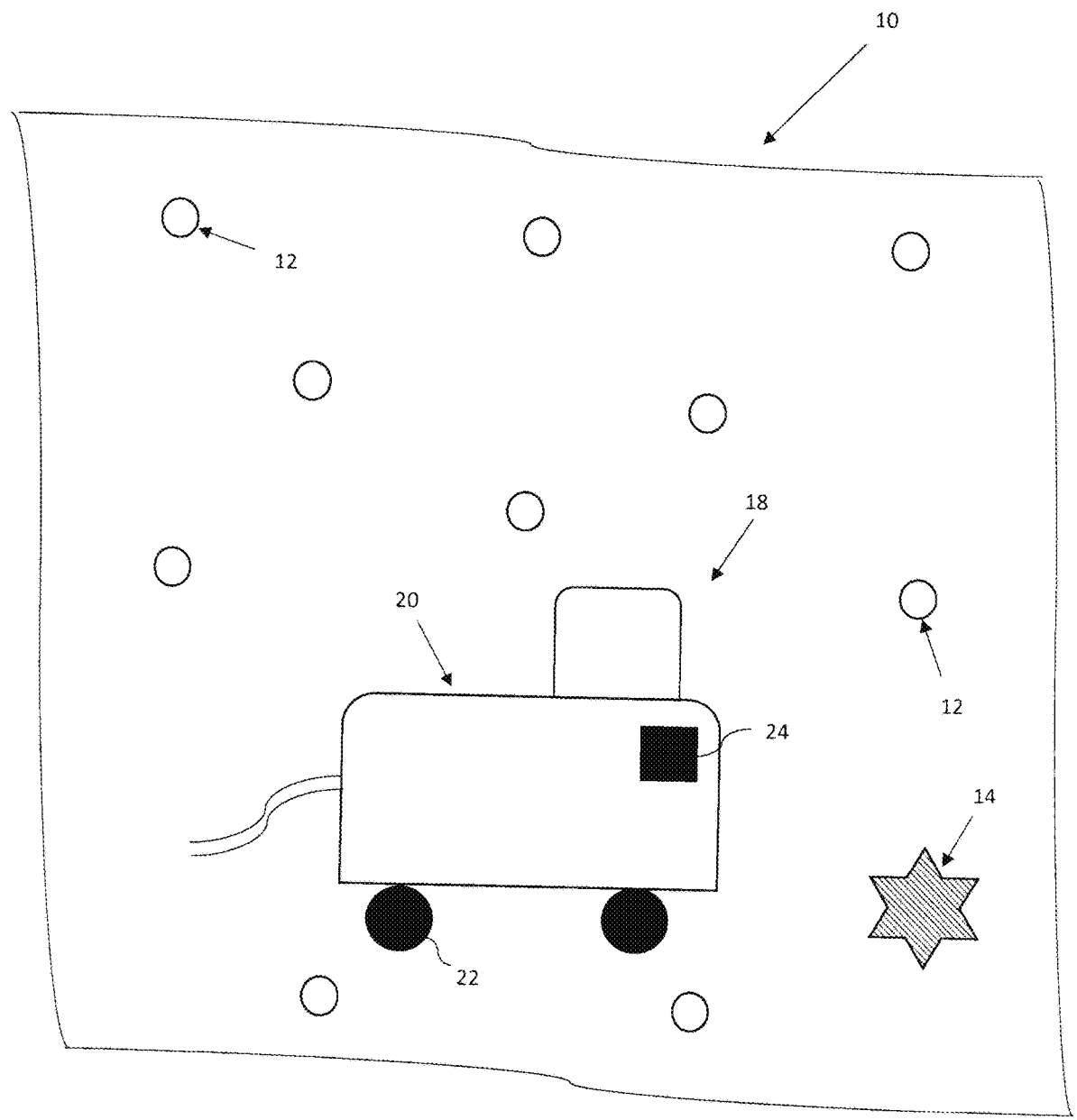
FIG. 1 depicts a blast site at which a blasting system is to be established through the use of the principles of the invention.

FIG. 1 of the accompanying drawings illustrates somewhat schematically a blast site 10 at which a number of blast holes 12 have been bored at selected positions. The extent of the blast site is indeterminate and varies from location to location. The number and extent of the blast holes are also variable. It is possible that the blast site can have geographical features 14 which are distinct. For example on a surface location such features may be large rocks, tracks in the ground, trees or the like. In an underground location the features may be markings on a hanging wall, boundary surfaces e.g. at a workface or the like. The invention is not limited in that respect. These features enable geographical locators to be determined with more accuracy, as is explained hereinafter.

A vehicle 18 traverses the blast site 10. The vehicle includes a load bed 20 and ground-engaging drivers 22 such as wheels, tracks or the like. The vehicle has a drive system 24 which, under the control of a processor 26 (FIG. 2), drives the drivers 22.

Figure 2:
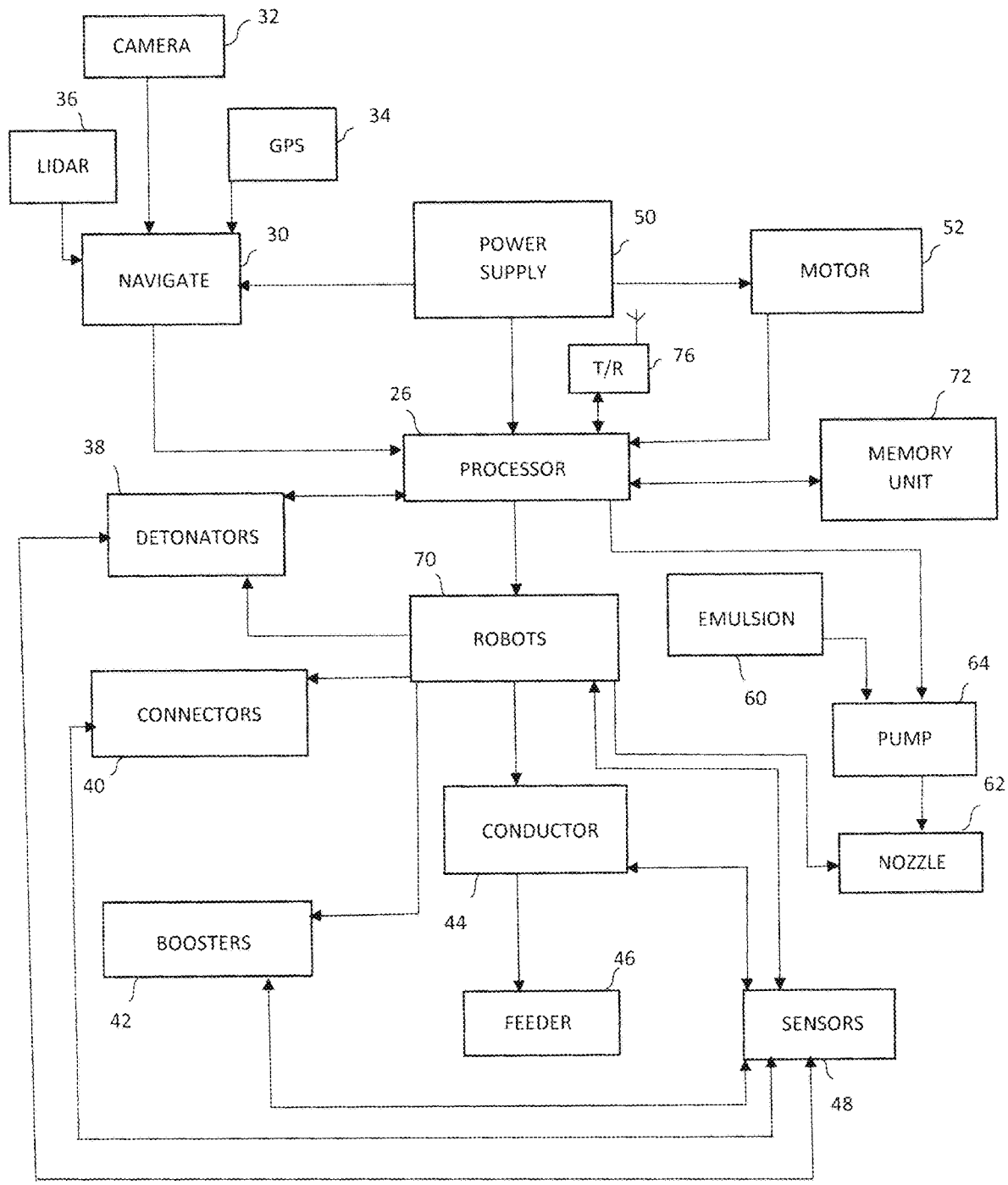
FIG. 2 depicts components in a vehicle which is used at the blast site shown in FIG. 1.

FIG. 2 illustrates various components which are carried on the load bed 20.

The load bed 20 carries a navigation system 30 which includes a number of cameras 32, a GPS arrangement 34 and distance measuring devices 36 such as for example, lidar, radar or sonar based devices. Defined locations on the load bed 20 include a store of detonators 38, a store of connectors 40 and a supply of boosters 42. Supplies of an elongate flexible signal-transmitting conductor 44, e.g. in coil or roll-form, are carried by the vehicle. This conductor 44 can be fed in a regulated manner under the control of the processor 26 through a feeder 46 to a point of use. The position of an end of the flexible conductor is determined with the aid of a number of sensors 48 e.g. cameras.

The processor 26 is powered by means of an appropriate onboard battery power supply 50 carried by the vehicle. This supply possibly coupled to a combustion engine (not shown) also provides energy for driving a motor 52 which forms part of the drive system 24 of the vehicle.

A source of an explosive emulsion 60 is carried by the vehicle or is towed by the vehicle. The emulsion 60 can be delivered through a nozzle 62 by means of a pump 64 which is driven by energy from the power supply 50 and which is controlled by the processor 26.

One or more robotic arms 70 are carried on the load bed. The operation of each robotic arm 70 is effected automatically, without user intervention, by means of the processor 26 which is responsive to a program held in a memory unit 72 and which can extract data from, and execute algorithms held in, the memory unit 72, according to requirement. Optionally, user intervention may be possible through the use of a remote control device which may be operable from a surface control room or via a mobile control centre or from a remote work station.

The blast site 10 may be underground or on the surface. The blast holes 12 are drilled using conventional techniques according to requirements which are in-dependently assessed.

Thereafter once the blasting system is to be implemented the vehicle 18 is used to traverse the blast site and to collect data pertaining to the position of each blast hole 12. This data is determined by means of the navigation aids carried by the vehicle i.e. the cameras 32, the GPS arrangement 34 and the lidar devices 36.

The collected data is correlated as far as is possible to information which is previously collected from the blast hole drilling process. Once the position of at least one blast hole has been determined and verified, pattern recognition techniques implemented for example by artificial intelligence protocols are used to identify the remaining blast holes.

As an alternative to the use of the ground travelling vehicle 18 a drone or similar airborne device can be used to survey the site aerially and to determine the blast hole positions. Such data is then transmitted to the processor 26 and is stored in the memory unit 72. Conveniently a transmitter-receiver unit 76 is associated with the processor 26 so that it can communicate with an aerial vehicle if required or with an operator, not shown. In this way the operator can be kept up to date on the movement of the vehicle (air borne or ground-based), its position, its state of use, the state of the power supply and any other variable factor on the vehicle.

The geographical survey can be facilitated by making use of the geographical features 14 which are previously mapped and to which position co-ordinates are assigned.

Once the site has been surveyed and the positions of the blast holes have been determined the processor 26 executes a program held in the memory 72 to assign to each blast hole 12 a respective time delay. Initially an appropriate algorithm is devised and this is used to assign time delays to respective blast holes in a predetermined manner. However with time, and through the use of the apparatus of the invention, feedback data is obtained which relates to the effectiveness of the algorithm in assigning time delays to the various blast holes. This approach allows parameters which characterize the effectiveness of a blast such as the degree and nature of rock fragmentation, the ratio of waste rock to ore, a heave factor and the velocity of detonation to be linked to the manner in which the algorithm is executed. Using the feedback data the algorithm is modified so that more appropriate time delays are assigned to the various blast holes in succeeding blasting systems. Through the use of this type of adaptive learning process the algorithm becomes self-learning and is capable then of providing improved performance at successive blasting sites.

The vehicle 18 traverses the blast site 10 and goes to each blast hole 12 in succession. At each blast hole a robotic arm 70 removes a detonator from the store of detonators 38. The processor 26 then programs the detonator 38 with the appropriate time delay for the intended blast hole into which the detonator is to be placed. A connector 40 is then coupled to the detonator. The connector is drawn from the connector store by means of a robotic arm 70 and is crimped onto the detonator 38 or is ultrasonically welded to the detonator according to the technique chosen. This process is controlled by means of one or more of the sensors 48 which monitor the process and provide data relating to the respective positions and orientations of each detonator and of the connector to the processor. If a booster 42 is to be used the detonator 38 is then coupled to a booster which has been drawn from the booster supply. The resulting detonator-booster assembly is then connected to one end of the conductor 44 which is directed via the feeding device 46 to the detonator booster assembly. This process is monitored by the sensors 48 and one or more robotic arms 70 are used to implement the connection process.

The elongate conductor 44 may be an electrical conductor or a fiber-optic cable. It is preferred however to make use of a shock tube for the connection process to a suitable detonator is thereby simplified. One end of the shock tube is inserted into an appropriate connector 40 and is crimped in position in a leak-proof manner. The shock tube, which is to be inserted into a blast hole 12, is thereby directly connected to the detonator-booster assembly. The connector 40 includes a second connection structure and this is connected to another shock tube which is to act as a surface line of a harness.

Once the detonator-booster assembly has been placed in position in a selected blast hole 12 a robotic arm 20 directs the nozzle 62 into a mouth of the blast hole and the pump 64 is operated under the control of the processor 26 to deliver a predetermined volume of emulsion from the source 60 into the blast hole. When the emulsion loading process is finished the processor 26 logs that the blast hole has been correctly established.

The vehicle then moves to the next blast hole trailing behind it a continuous length of the shock tube 44 which, as noted, acts as a surface line of the harness. At the next blast hole 12 the preceding process is repeated and a downline shock tube length is connected to the surface line.

If the blasting system is a wireless system then the flexible conductors 44 are not required. The establishment of the blasting system is however otherwise similar to what has been described in that once a wireless detonator-booster assembly has been placed into a blast hole the emulsion is pumped into the blast hole in the manner which has been described.

In each instance the effect of the blast is monitored by external devices (not shown) to generate feedback data which is supplied to the processor 26 so that an algorithm which is used to assign blast delays to the various detonators can be modified and improved.

For underground use the vehicle 18 may include a platform which can be elevated relative to the load bed. The platform carries the robotic arms 70 which can move through 180° or more for tunneling and up-holes, and which are able to reach locations which are elevated relative to the ground on which the vehicle moves. For a surface application this type of platform is normally not required.

The invention claimed is:

1. A method of establishing a blasting system which includes the steps of surveying a blast site to generate data which determines the respective positions of a plurality of blast holes previously formed at the site,
    calculating from the data produced by the survey, for each of the plurality of blast holes, a respective time delay,
    allowing an autonomously controlled vehicle to traverse the blast site moving successively from blast hole to blast hole,
    at each blast hole:
        using robotic means to remove a detonator from a store of a plurality of detonators on the vehicle,
        using the robotic means operable by a processor to program the removed detonator with the respective time delay calculated for each of the plurality of blast holes to thereby implement a selected blasting sequence for the plurality of blast holes at the blast site,
        using the robotic means to place the removed and programmed detonator in the blast hole for which the respective time delay was calculated, and
        pumping into the blast hole a predetermined volume of an emulsion from a source carried on or associated with the vehicle.

2. A method according to claim 1 which includes the steps of using the robotic means to connect the removed detonator to a flexible signal-transmitting conductor and to a booster thereby to form a booster assembly, and thereafter placing the booster assembly into the blast hole.

3. Apparatus for use in establishing a blasting system which includes a vehicle with:
    a load bed,
    ground-engaging drivers which support the load bed, and
    a drive system for driving the ground-engaging drivers in a controlled manner over the ground, and
    mounted on or coupled to the load bed;
    navigation aids for determining the position of the vehicle in relation to a blast site at which a plurality of blast holes have previously been formed,
    a processor, responsive to the navigation aids, for controlling movement of the vehicle at the blast site whereby the vehicle is controlled to move in succession to each of the blast holes,
    a store of a plurality of detonators,
    robotic means, operable by the processor at each blast hole to remove from the store a detonator, to program the removed detonator with a respective delay time calculated for each of the plurality of blast holes to thereby implement a selected blasting sequence for the plurality of blast holes at the blast site, and to place the respective programmed detonator into the blast hole for which the respective time delay was calculated, and
    a pump, under the control of the processor,
    the pump serving to pump a controlled amount of emulsion from a source on or associated with the vehicle into the respective blast hole.

4. Apparatus according to claim 3 wherein each detonator is connected to a booster to form a booster assembly which is placed into a respective borehole.

5. Apparatus for use in establishing a blasting system which includes a vehicle with:
    a load bed,
    ground-engaging drivers which support the load bed, and
    a drive system for driving the ground-engaging drivers in a controlled manner over the ground, and
    mounted on or coupled to the load bed:
    navigation aids for determining the position of the vehicle in relation to a blast site at which a plurality of blast holes have previously been formed,
    a processor, responsive to the navigation aids, for controlling movement of the vehicle at the blast site whereby the vehicle is controlled to move in succession to each of the blast holes, wherein the processor is responsive to data held in a memory unit and is configured to implement an adaptive learning process in which the blasting result of each blast is measured and correlated to an assignment of time delays to detonators in different blast holes,
    a store of a plurality of detonators,
    robotic means, operable by the processor at each blast hole to remove from the store a detonator, to program the removed detonator with a delay time calculated for the respective blast hole, and to place the programmed detonator into the blast hole, and a pump, under the control of the processor, the pump serving to pump a controlled amount of emulsion from a source on or associated with the vehicle into the respective blast hole.

6. Apparatus according to claim 5 wherein each detonator is connected to a booster to form a booster assembly which is placed into a respective borehole and the processor is responsive to data held in a memory unit and is configured to implement an adaptive learning process in which the blasting result of each blast is measured and correlated to an assignment of time delays to detonators in different blast holes.

* * * * *